United States Patent
Qiao

(10) Patent No.: US 12,445,282 B2
(45) Date of Patent: Oct. 14, 2025

(54) METHOD AND APPARATUS FOR SYNCHRONIZING INFORMATION, AND STORAGE MEDIUM

(71) Applicant: BEIJING XIAOMI MOBILE SOFTWARE CO., LTD., Beijing (CN)

(72) Inventor: Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 293 days.

(21) Appl. No.: 18/090,014

(22) Filed: Dec. 28, 2022

(65) Prior Publication Data

US 2023/0216673 A1 Jul. 6, 2023

(30) Foreign Application Priority Data

Jan. 6, 2022 (CN) .......................... 202210011279.8

(51) Int. Cl.
*H04L 9/08* (2006.01)
*G06F 16/27* (2019.01)
*H04L 67/1095* (2022.01)
*B60R 25/20* (2013.01)
(Continued)

(52) U.S. Cl.
CPC ............ *H04L 9/0891* (2013.01); *G06F 16/27* (2019.01); *H04L 9/0816* (2013.01); *H04L 9/0838* (2013.01); *H04L 9/0894* (2013.01); *H04L 67/1095* (2013.01); *B60R 25/209* (2013.01); *B60R 25/24* (2013.01); *H04L 67/55* (2022.05)

(58) Field of Classification Search
CPC ... H04L 9/0891; H04L 9/0838; H04L 9/0894; H04L 67/1097; H04L 67/12; H04L 67/55; H04L 67/1095; H04L 9/0816; H04L 2209/84; B60R 25/209; B60R 25/24; G06F 16/27; G07C 9/00309; G07C 9/00571; G07C 2009/00507; G07C 2009/00547
See application file for complete search history.

(56) References Cited

U.S. PATENT DOCUMENTS

| | | | |
|---|---|---|---|
| 2011/0238639 A1* | 9/2011 | Matsuura | G06F 16/1748 707/698 |
| 2015/0148989 A1* | 5/2015 | Cooper | E05F 15/77 701/2 |
| 2018/0213405 A1* | 7/2018 | Jung | H04W 12/069 |

(Continued)

FOREIGN PATENT DOCUMENTS

| | | |
|---|---|---|
| CN | 109673000 A | 4/2019 |
| CN | 111132199 A | 5/2020 |

(Continued)

OTHER PUBLICATIONS

European Patent Application No. 22217002.9, extended Search and Opinion dated Jun. 2, 2023, 7 pages.

(Continued)

*Primary Examiner* — Cheng-Feng Huang
(74) *Attorney, Agent, or Firm* — Cozen O'Connor

(57) ABSTRACT

A method and an apparatus for synchronizing information, and a storage medium. The method includes acquiring, in response to determining that a digital key name has been changed by a vehicle-side device, a first name of a digital key changed by the vehicle-side device; and changing a digital key name displayed on the terminal device to the first name.

18 Claims, 10 Drawing Sheets acquiring, in response to determining that a digital key name has been changed by a vehicle-side device, a first name of a digital key changed by the vehicle-side device — 101 changing a digital key name displayed on the terminal device to the first name — 102

(51) Int. Cl.
*B60R 25/24* (2013.01)
*H04L 67/55* (2022.01)

(56) References Cited

U.S. PATENT DOCUMENTS

2019/0213275 A1\* 7/2019 Shankar .............. G06F 16/2358
2020/0391695 A1\* 12/2020 Yang ........................ G06F 21/35

FOREIGN PATENT DOCUMENTS

| JP | 2011233068 A | 11/2011 |
| JP | 2013155554 A | 8/2013 |
| JP | 2016215779 A | 12/2016 |
| JP | 2018048493 A | 3/2018 |
| JP | 2020037296 A | 3/2020 |

OTHER PUBLICATIONS

Japanese Patent Application No. 2022-212382, Decision to Grant Patent dated Jan. 5, 2024, 2 pages.
Japanese Patent Application No. 2022-212382, English translation of Decision to Grant Patent dated Jan. 5, 2024, 3 pages.
Chinese Patent Application No. 202210011279.8, Office Action with English translation dated May 23, 2025, 15 pages.

\* cited by examiner

METHOD AND APPARATUS FOR SYNCHRONIZING INFORMATION, AND STORAGE MEDIUM

CROSS-REFERENCE TO RELATED APPLICATION

This application is based on and claims priority to Chinese Patent Application No. 2022100112798, filed on Jan. 6, 2022, the entire contents of which are incorporated herein by reference.

FIELD

The present disclosure relates to the field of digital keys, and more particularly, to a method and apparatus for synchronizing information, and a storage medium.

BACKGROUND

Key information may be registered with a vehicle-side server after a digital key based on a locally generated asymmetric key is generated at a terminal device side. In the registration of the key information, a digital key name may be synchronized to a vehicle-side device via the vehicle-side server.

SUMMARY

The present disclosure discloses a method and apparatus for synchronizing information, and a storage medium.

According to a first aspect of embodiments of the present disclosure, there is provided a method for synchronizing information, which is applied to a terminal device. The method includes acquiring, in response to determining that a digital key name has been changed by a vehicle-side device, a first name of a digital key changed by the vehicle-side device; and changing a digital key name displayed on the terminal device to the first name.

According to a second aspect of embodiments of the present disclosure, there is provided a method for synchronizing information, which is applied to a vehicle-side device. The method includes acquiring, in response to determining that a digital key name has been changed by a terminal device, a second name of a digital key changed by the terminal device; and changing a digital key name displayed on the vehicle-side device to the second name.

According to a third aspect of embodiments of the present disclosure, there is provided a computer-readable storage medium having stored therein computer programs that, when executed by a processor, cause steps in the method for synchronizing information as described in any embodiment above from the side of the terminal device side to be implemented.

According to a fourth aspect of embodiments of the present disclosure, there is provided a computer-readable storage medium having stored therein computer programs that, when executed by a processor, cause steps in the method for synchronizing information as described in any embodiment above from the side of the vehicle-side device to be implemented.

According to a fifth aspect of embodiments of the present disclosure, there is provided an apparatus for synchronizing information. The apparatus includes a processor; and a memory for storing instructions executable by the processor. The processor is configured to execute the instructions to implement steps of the method for synchronizing information as described in any embodiment above from the side of the terminal device side.

According to a sixth aspect of embodiments of the present disclosure, there is provided an apparatus for synchronizing information. The apparatus includes a processor; and a memory for storing instructions executable by the processor. The processor is configured to execute the instructions to implement steps of the method for synchronizing information as described in any embodiment above from the side of the vehicle-side device.

It is to be understood that both the foregoing general description and the following detailed description are illustratively and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to various embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the present disclosure as recited in the appended claims.

In related art, if a user modifies the digital key name on the terminal device or the vehicle-side device, the synchronization of the digital key name cannot be realized, and the terminal device and the vehicle-side device will display different digital key names respectively, resulting in poor user experience.

In the following, a method for synchronizing information provided by the present disclosure is first described from a terminal device side.

Figure 1:
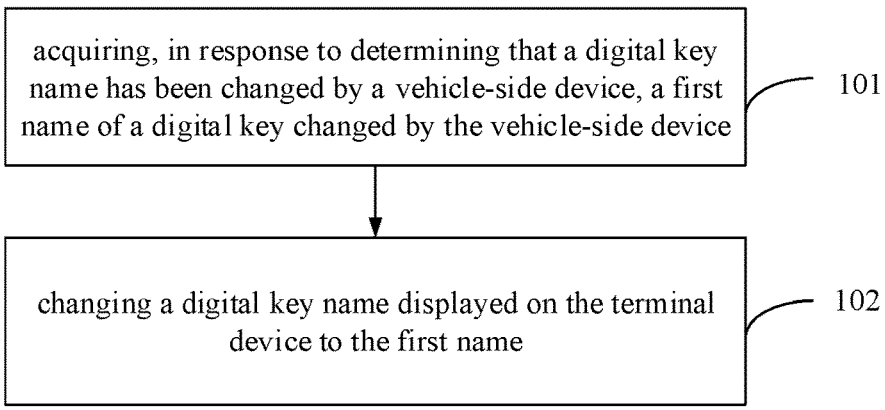
FIG. 1 is a schematic flow chart showing a method for synchronizing information according to an illustrative embodiment of the present disclosure.

FIG. 1 is a schematic flow chart showing a method for synchronizing information according to an illustrative embodiment of the present disclosure, referring to FIG. 1, the method is described from a terminal device side. The terminal device includes, but is not limited to, a mobile phone, a laptop computer, a desktop computer, an ipad, etc. As shown in FIG. 1, the method for synchronizing information may include a step 101, and a step 102.

In step 101, in response to determining that a digital key name has been changed by a vehicle-side device, a first name of a digital key changed by the vehicle-side device is acquired.

In an embodiment of the present disclosure, the digital key name includes, but is not limited to, a name or nickname of the digital key named by a user.

In a possible implementation, a digital key applet on the terminal device can detect whether the digital key name has been changed by the vehicle-side device, and then a digital key framework (DKF) on the terminal device acquires the first name of the digital key changed by the vehicle-side device.

In another possible implementation, each time after communication between the terminal device and the vehicle-side device is completed by using the digital key, for example, after a transaction operation, such as opening a door, starting the vehicle, etc., is completed, the DKF on the terminal device may detect whether the digital key name has been changed by the vehicle-side device, and then the DKF acquires the first name of the digital key changed by the vehicle-side device.

In step 102, a digital key name displayed on the terminal device is changed to the first name.

In an embodiment of the present disclosure, the digital key name displayed on the terminal device may be changed to the first name by the DKF on the terminal device.

In the above-mentioned embodiments, in the case where the digital key name has been changed by the vehicle-side device, the terminal device can synchronize the first name of the digital key changed by the vehicle-side device to the terminal device in time, thus realizing the purpose of synchronizing the digital key name between the terminal device and the vehicle-side device with high availability.

Figure 2:
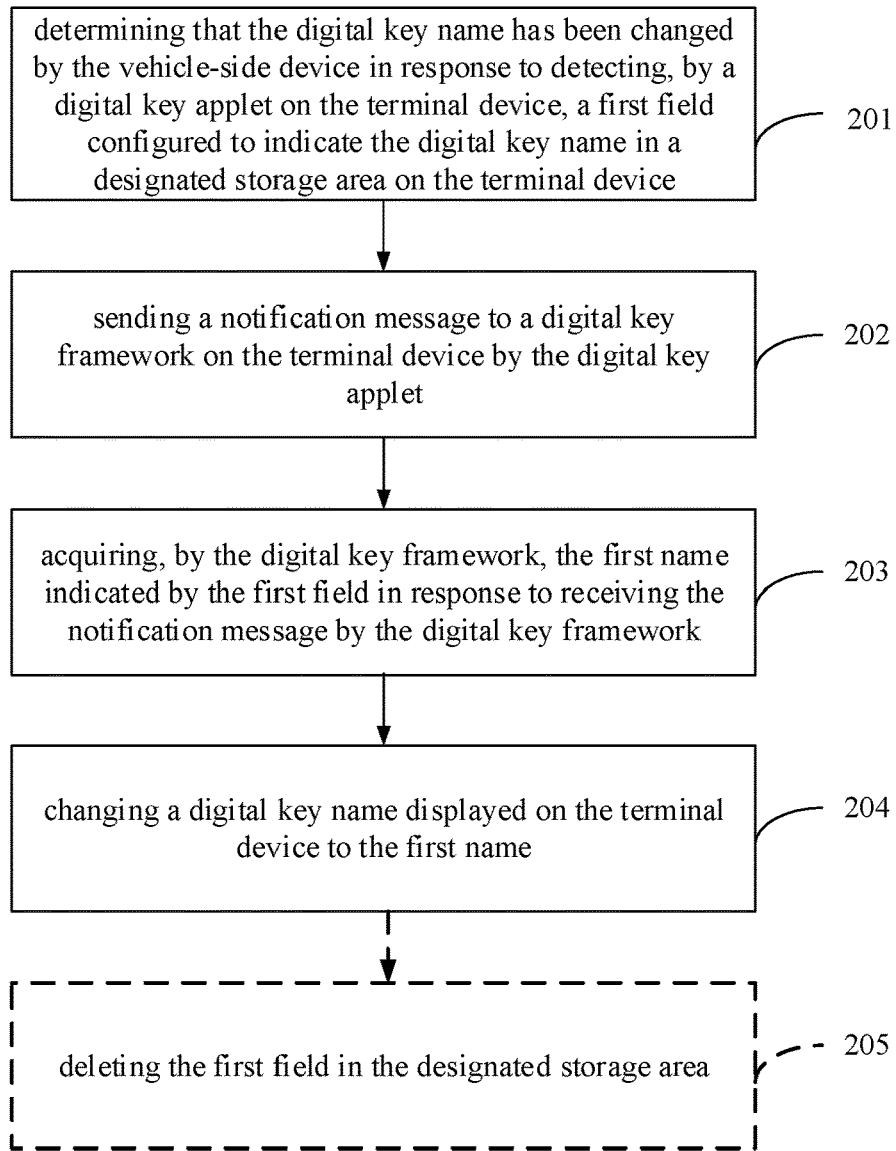
FIG. 2 is a schematic flow chart showing a method for synchronizing information according to an illustrative embodiment of the present disclosure.

In some optional embodiments, referring to FIG. 2, which is a schematic flow chart showing a method for synchronizing information according to an illustrative embodiment of the present disclosure, the method may be applied to a terminal device, and includes steps 201 to 205.

In step 201, it is determined that the digital key name has been changed by the vehicle-side device in response to detecting, by a digital key applet on the terminal device, a first field configured to indicate the digital key name in a designated storage area on the terminal device.

In an embodiment of the present disclosure, the designated storage area is a storage area that supports access of the terminal device and the vehicle-side device. In a process of creating a digital key, the terminal device will allocate a storage area for the created digital key. The storage area may be accessed not only by the terminal device, but also by the vehicle-side device through near field communication (NFC), Bluetooth, etc. The storage area may serve as the designated storage area of the present disclosure.

The first field may be in a preset tag length value (TLV) format. The terminal device and the vehicle-side device may negotiate the preset TLV format in advance, or the preset TLV format may be predetermined in a protocol.

In a possible implementation, assuming that a value of a Tag field is 0xD3, which is configured to indicate the digital key name, when the digital key applet detects a field in the designated storage area that is in the preset TLV format, and the value of the Tag field included in the field is 0xD3, the digital key applet can determine that the first field is detected, and determined that the digital key name has been changed by the vehicle-side device.

In step 202, a notification message is sent to a digital key framework on the terminal device by the digital key applet.

In an embodiment of the present disclosure, the notification message is configured to notify the digital key framework that the digital key name has been changed by the vehicle-side device.

In a possible implementation, the notification message may be sent to the digital key framework on the terminal device by the digital key applet via a host controller interface (HCI).

In step 203, the first name indicated by the first field is acquired by the digital key framework, in response to receiving the notification message by the digital key framework.

In an embodiment of the present disclosure, when receiving the notification message sent by the digital key applet, the digital key framework can acquire a value field included in the first field in the designated storage area, so as to determine the first name, and the first name is the digital key name changed by the vehicle-side device.

In step 204, a digital key name displayed on the terminal device is changed to the first name.

In an embodiment of the present disclosure, the digital key key name displayed on the terminal device may be changed to the first name by the digital key framework.

In step 205, the first field is deleted in the designated storage area.

In embodiments of the present disclosure, the digital key framework on the terminal device may delete the first field after the digital key name displayed on the terminal device is changed to the first name, so that when the digital key name is changed again by the terminal device or the vehicle-side device, the synchronization of the digital key name can be performed in time and errors in the synchronization process can be avoided.

In embodiments of the present disclosure, the step 205 is optionally performed. That is, the first field may also not be deleted after the digital key name displayed on the terminal device is changed to the first name. The terminal device acquires the first name indicated by the first field with a latest generation time point for the synchronization of the digital key name each time, which can also realize the purpose of synchronizing the digital key name between the terminal device and the vehicle-side device.

In the above-mentioned embodiments, the digital key applet on the terminal device can detect whether there is the first field configured to indicate the digital key name in the designated storage area on the terminal device, so as to determine whether the digital key name has been changed by the vehicle-side device. In addition, the first field in the designated storage area may be deleted after the terminal device synchronizes the first name of the digital key changed by the vehicle-side device, so as to avoid overly occupying resources of the designated storage area, and improve the timeliness and accuracy of the synchronization of the digital key name.

Figure 3:
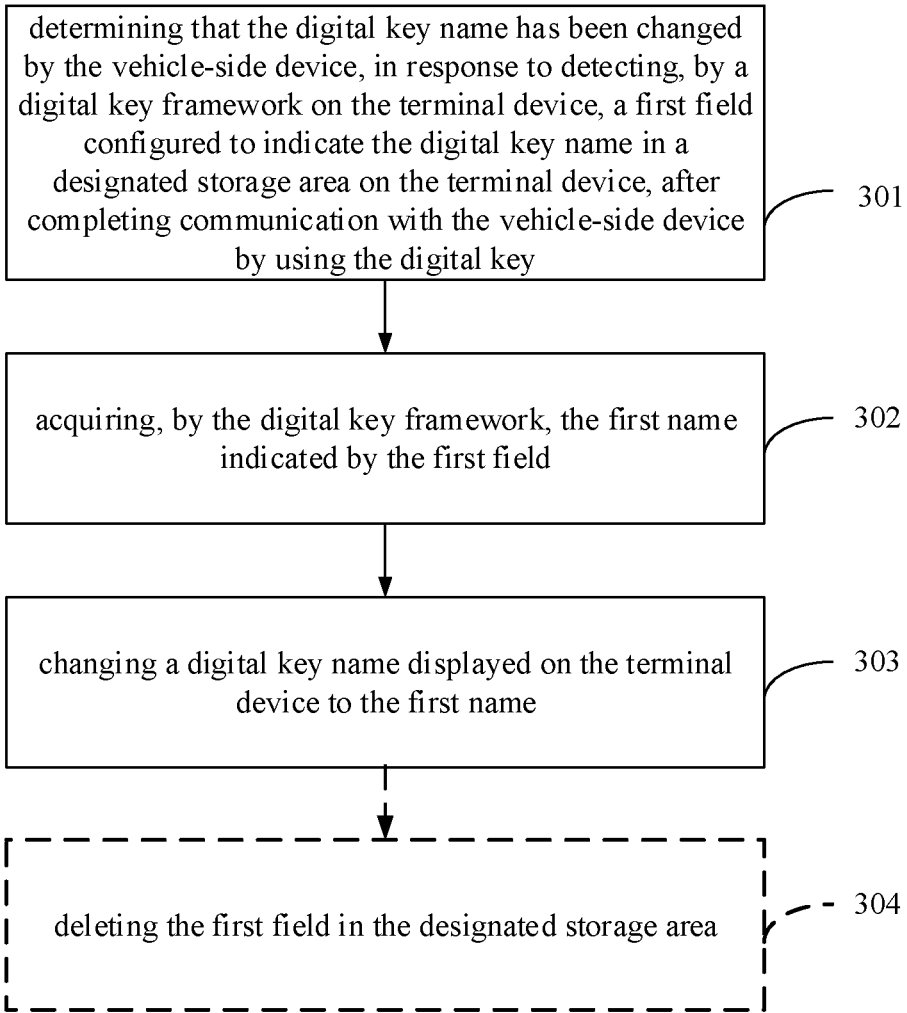
FIG. 3 is a schematic flow chart showing a method for synchronizing information according to an illustrative embodiment of the present disclosure.

In some optional embodiments, referring to FIG. 3, which is a schematic flow chart showing a method for synchronizing information according to an illustrative embodiment of the present disclosure, the method may be applied to a terminal device, and includes steps 301 to 304.

In step 301, it is determined that the digital key name has been changed by the vehicle-side device, in response to detecting, by a digital key framework on the terminal device, a first field configured to indicate the digital key name in a designated storage area on the terminal device, after completing communication with the vehicle-side device by using the digital key.

In an embodiment of the present disclosure, the designated storage area is a storage area that supports access of the terminal device and the vehicle-side device. In a process of creating a digital key on the terminal device, the terminal device will allocate a storage area for the created digital key. The storage area may be accessed not only by the terminal device, but also by the vehicle-side device through near field communication, Bluetooth, etc. This storage area may serve as the designated storage area of the present disclosure.

The first field may be in the preset TLV format. The terminal device and the vehicle-side device may negotiate the preset TLV format in advance, or the preset TLV format may be predetermined in a protocol.

In a possible implementation, each time after communication between the terminal device and the vehicle-side device is completed, for example, after a transaction operation, such as opening a door, starting the vehicle, etc., is completed, the digital key framework can detect the designated storage area. If a field in the preset TLV format is detected in the designated storage area, and a value of a Tag field in the field is 0xD3, the digital key framework can determine that the first field is detected, and determine that the digital key name has been changed by the vehicle-side device.

In step 302, the first name indicated by the first field is acquired by the digital key framework.

In an embodiment of the present disclosure, in the case where the digital key framework determines that the digital key name has been changed by the vehicle-side device, the value field of the first field in the designated storage area may be acquired by the digital key framework, so as to determine the first name, and the first name is the digital key name changed by the vehicle-side device.

In step 303, a digital key name displayed on the terminal device is changed to the first name.

In an embodiment of the present disclosure, the digital key name displayed on the terminal device may be changed to the first name by the digital key framework.

In step 304, the first field is deleted in the designated storage area.

In an embodiment of the present disclosure, in order to synchronize the digital key name in time and avoid errors in the synchronization process when the digital key name is changed again by the vehicle-side device, the digital key framework on the terminal device may delete the first field after the digital key name displayed on the terminal device is changed to the first name.

It is understood that the step 304, similar to the step 205, is an optional step to be performed.

In the above-mentioned embodiment, the digital key framework on the terminal device can detect whether there is the first field configured to indicate the digital key name in the designated storage area on the terminal device, so as to determine whether the digital key name has been changed by the vehicle-side device. In addition, the first field in the designated storage area may be deleted after the terminal device synchronizes the first name of the digital key changed by the vehicle-side device, so as to avoid overly occupying resources of the designated storage area, and improve the timeliness and accuracy of the synchronization of the digital key name.

Figure 4:
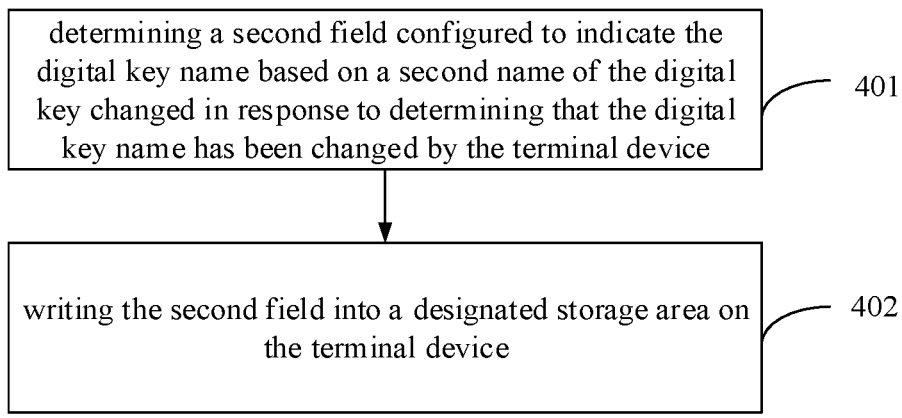
FIG. 4 is a schematic flow chart showing a method for synchronizing information according to an illustrative embodiment of the present disclosure.

In some optional embodiments, referring to FIG. 4, which is a schematic flow chart showing a method for synchronizing information according to an illustrative embodiment of the present disclosure, the method may be applied to a terminal device, and includes a step 401, and a step 402.

In step 401, a second field configured to indicate a digital key name is determined based on a second name of a digital key changed in response to determining that the digital key name has been changed by the terminal device.

In an embodiment of the present disclosure, in the case where the terminal device determines that the digital key name on the terminal device has been changed by a user, the second field may be determined based on the second name of the digital key changed, and the second field may be in the preset TLV format.

In a possible implementation, the terminal device and the vehicle-side device may negotiate the preset TLV format in advance, or the preset TLV format may be predetermined in a protocol.

In another possible implementation, the digital key framework on the terminal device can set a value of a Tag field to 0xD3 according to the preset TLV format to indicate the digital key name, a value of a length field may be determined according to a length of the second name, and a value of a value field may be set to the second name to obtain the second field.

In step 402, the second field is written into a designated storage area on the terminal device.

In an embodiment of the present disclosure, the designated storage area is a storage area that supports access of the terminal device and the vehicle-side device. The second field may be written into the designated storage area by the digital key framework.

In embodiments of the present disclosure, the steps 401 to 402 may be deployed alone or in combination with the steps 201 to 205. In a specific implementation, the step 401 may be performed after the step 205 is performed. Alternatively, the steps 401 to 402 may be performed first, and the above-mentioned steps 201 to 205 may be continued after the vehicle-side device synchronizes the second name to the vehicle-side device and deletes the second field in the designated storage area.

Similarly, the steps 401 to 402 may also be deployed in combination with the steps 301 to 304, and a combination mode is similar to that with the steps 201 to 205, which will not be elaborated herein.

In the above-mentioned embodiments, in the case where the digital key name has been changed by a terminal device side, the second field configured to indicate the digital key name may be determined based on the second name of the digital key changed, and the second field may be written into the designated storage area on the terminal device, so that the vehicle-side device can access the designated storage area, and synchronizes the second name to the vehicle-side device, thereby realizing the purpose of synchronizing the digital key name between the terminal device and the vehicle-side device with high availability.

Next, a method for synchronizing information provided by the present disclosure will be described from a vehicle-side device.

Figure 5:
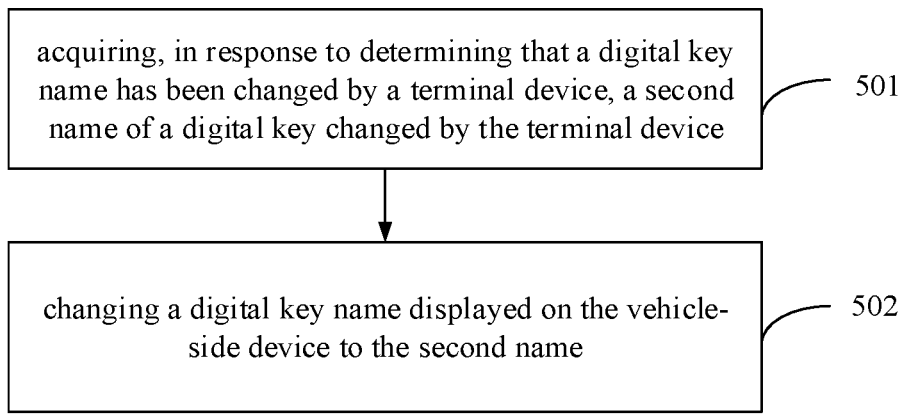
FIG. 5 is a schematic flow chart showing a method for synchronizing information according to an illustrative embodiment of the present disclosure.

Referring to FIG. 5, which is a schematic flow chart showing a method for synchronizing information according to an illustrative embodiment of the present disclosure, the method is described from a vehicle-side device, which may be a vehicle. As shown in FIG. 5, the method for synchronizing information may include a step 501, and a step 502.

In step 501, in response to determining that a digital key name has been changed by a terminal device, a second name of a digital key changed by the terminal device is acquired.

In an embodiment of the present disclosure, the digital key name includes, but is not limited to, a name or nickname of the digital key named by a user.

In a possible implementation, each time after communication between the terminal device and the vehicle-side device is completed by using the digital key, for example, after a transaction operation, such as opening a door, starting the vehicle, etc., is completed, the vehicle-side device may detect whether the digital key name has been changed by the terminal device, and the vehicle-side device may acquire the second name of the digital key changed by the terminal device.

In step 502, a digital key name displayed on the vehicle-side device is changed to the second name.

In the above-mentioned embodiments, in the case where the digital key name has been changed by the terminal device, the vehicle-side device can synchronize the second name of the digital key changed by the terminal device to the vehicle-side device in time, thus realizing the purpose of synchronizing the digital key name between the terminal device and the vehicle-side device with high availability.

Figure 6:
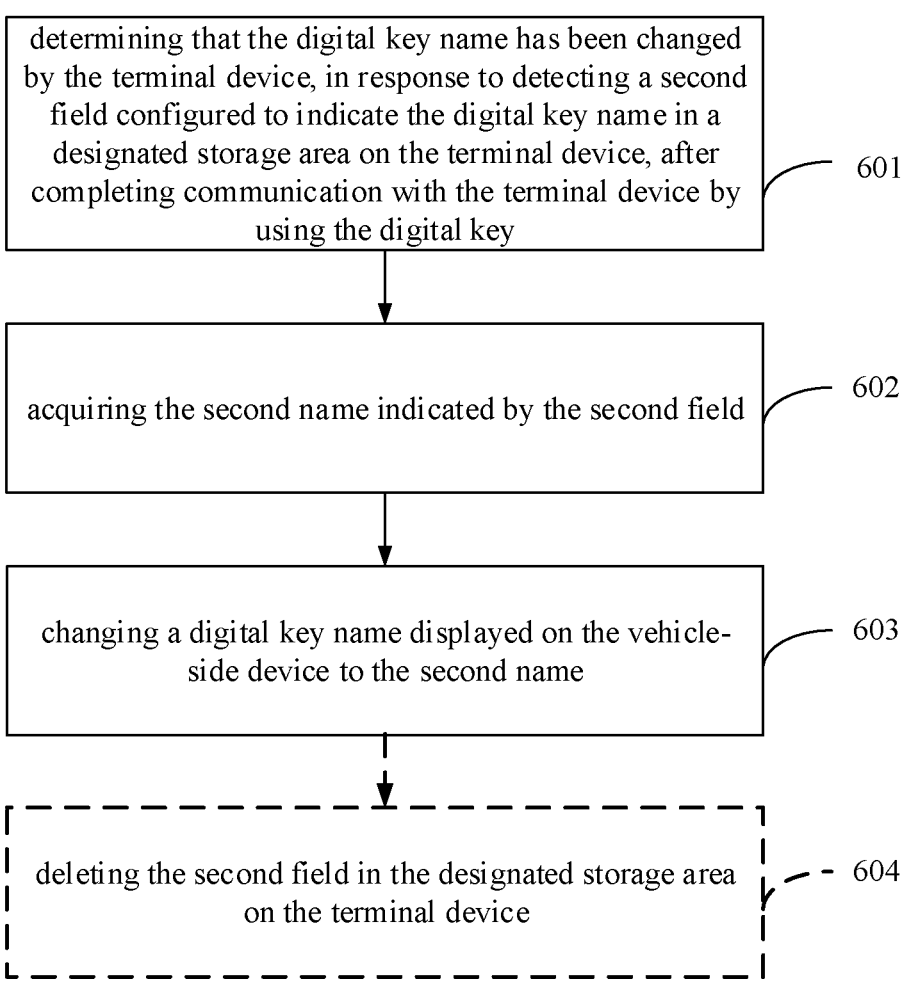
FIG. 6 is a schematic flow chart showing a method for synchronizing information according to an illustrative embodiment of the present disclosure.

In some optional embodiments, referring to FIG. 6, which is a schematic flow chart showing a method for synchronizing information according to an illustrative embodiment of the present disclosure, the method may be applied to vehicle-side device, and includes steps 601 to 604.

In step 601, it is determined that the digital key name has been changed by the terminal device, in response to detecting a second field configured to indicate the digital key name in a designated storage area on the terminal device, after completing communication with the terminal device by using the digital key.

In an embodiment of the present disclosure, the designated storage area is a storage area that supports access of the terminal device and the vehicle-side device. In a process of creating a digital key on the terminal device, the terminal device will allocate a storage area for the created digital key. The storage area may be accessed not only by the terminal device, but also by the vehicle-side device through near field communication, Bluetooth, etc. This storage area may serve as the designated storage area of the present disclosure.

The second field may be in the preset TLV format. The terminal device and the vehicle-side device may negotiate the preset TLV format in advance, or the preset TLV format may be predetermined in a protocol.

In a possible implementation, each time after communication between the terminal device and the vehicle-side device is completed, for example, after a transaction operation, such as opening a door, starting the vehicle, etc., is completed, the vehicle-side device may access the designated storage area through the near field communication, Bluetooth, etc., and detect whether there is a field in the preset TLV format in the designated storage area, and a value of a Tag field included in the field is 0xD3. In the case where the field is detected, it is determined that the second field configured to indicate the digital key name is detected, and it is determined that the digital key name has been changed by the terminal device.

In step 602, a second name indicated by the second field is acquired.

In an embodiment of the present disclosure, in the case where it is determined that the digital key name has been changed by the terminal device, the vehicle-side device may acquire the value field of the second field in the designated storage area on the terminal device, so as to determine the second name, and the second name is the digital key name changed by the terminal device.

In step 603, a digital key name displayed on the vehicle-side device is changed to the second name.

In step 604, the second field is deleted in the designated storage area on the terminal device.

In an embodiment of the present disclosure, in order to synchronize the digital key name in time and avoid errors in the synchronization process when the digital key name is changed again by the terminal device, the vehicle-side device may delete the second field in the designated storage area on the terminal device after the digital key name displayed on the vehicle-side device is changed to the second name.

The step 604 is optionally performed. That is, the second field may also not be deleted after the digital key name displayed on the vehicle-side device is changed to the second name. The vehicle-side device may acquire the second name indicated by the second field with a latest generation time point for the synchronization of the digital key name each time.

In the above-mentioned embodiments, the vehicle-side device can detect whether there is the second field configured to indicate the digital key name in the designated storage area on the terminal device, so as to determine whether the digital key name has been changed by the terminal device. In addition, the second field in the designated storage area may be deleted after the vehicle-side device synchronizes the second name of the digital key changed by the terminal device, so as to avoid overly occupying resources of the designated storage area, and improve the timeliness and accuracy of the synchronization of the digital key name.

Figure 7:
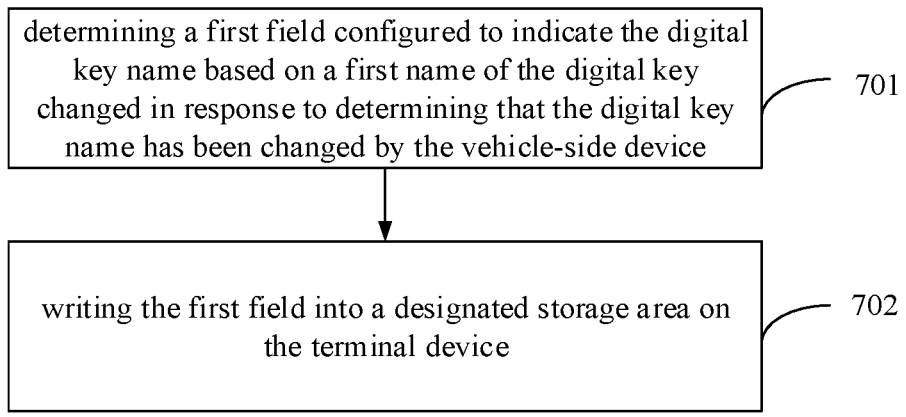
FIG. 7 is a schematic flow chart showing a method for synchronizing information according to an illustrative embodiment of the present disclosure.

In some optional embodiments, referring to FIG. 7, which is a schematic flow chart showing a method for synchronizing information according to an illustrative embodiment of the present disclosure, the method may be applied to a vehicle-side device, and includes a step 701, and a step 702.

In step 701, a first field configured to indicate the digital key name is determined based on a first name of the digital key changed in response to determining that the digital key name has been changed by the vehicle-side device.

In an embodiment of the present disclosure, in the case where the vehicle-side device determines that the digital key name on the vehicle-side device has been changed by a user, the first field may be determined based on the first name of the digital key changed, and the first field may be in the preset TLV format.

In a possible implementation, the terminal device and the vehicle-side device may negotiate the preset TLV format in advance, or the preset TLV format may be predetermined in a protocol.

In another possible implementation, the vehicle-side device can set the value of the Tag field to 0xD3 according to the preset TLV format to indicate the digital key name, a value of a length field may be determined according to a length of the first name, and a value of a value field may be set to the first name to obtain the first field.

In step 702, the first field is written into a designated storage area on the terminal device.

In an embodiment of the present disclosure, the designated storage area is a storage area that supports access of the terminal device and the vehicle-side device. The vehicle-side device can access the designated storage area and write the first field into the designated storage area.

In embodiments of the present disclosure, the steps 701 to 702 may be deployed alone or in combination with the steps 601 to 604. In a specific implementation, the step 701 may be performed after the step 604 is performed. Alternatively, the steps 701 to 702 may be performed first, and the above-mentioned steps 601 to 604 may be continued after the terminal device synchronizes the first name to the terminal device and deletes the first field in the designated storage area.

In the above-mentioned embodiments, in the case where the digital key name has been changed by the vehicle-side device, the first field configured to indicate the digital key name may be determined based on the first name of the digital key changed, and the first field may be written into the designated storage area on the terminal device, so that the terminal device can access the designated storage area, and synchronize the first name to the terminal device, realizing the purpose of synchronizing the digital key name between the terminal device and the vehicle-side device with high availability.

Figure 8:
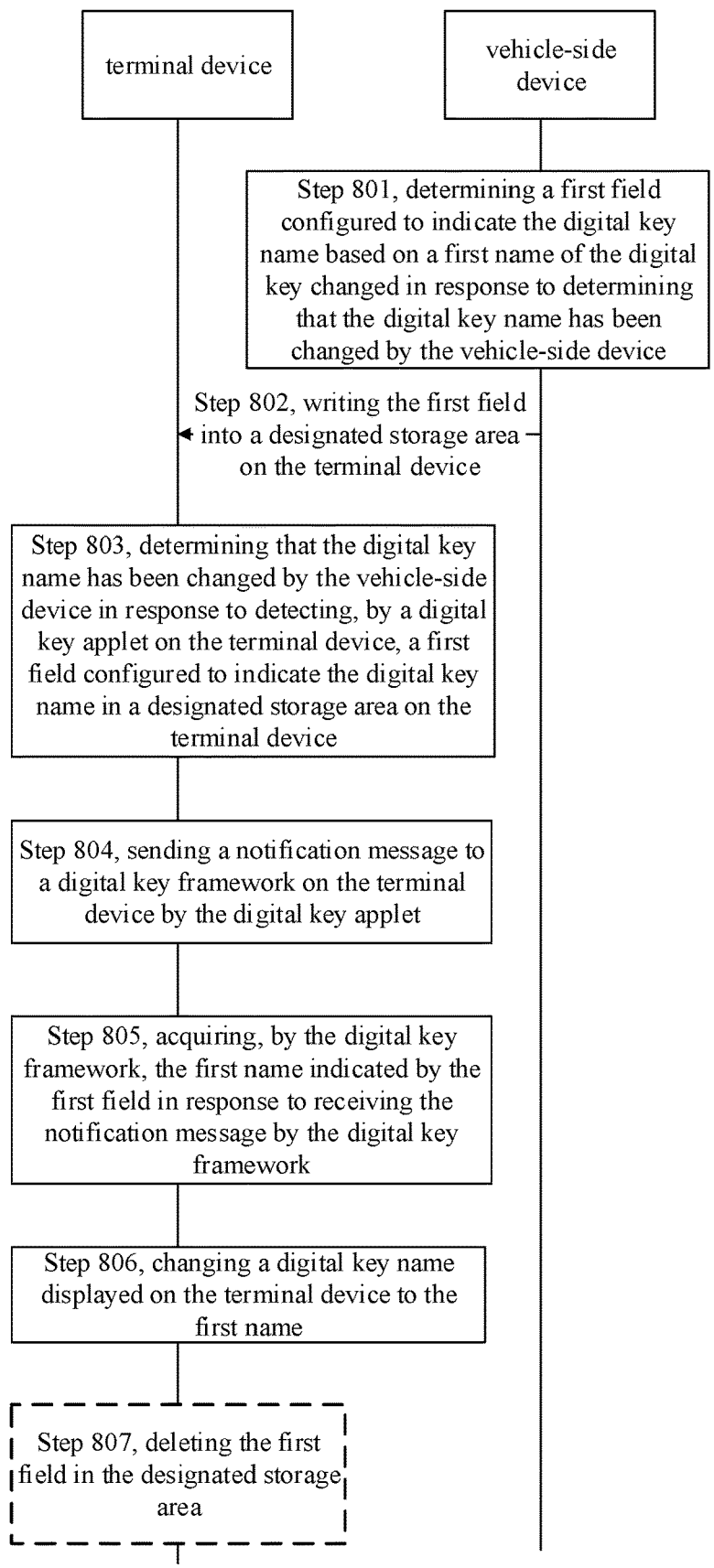
FIG. 8 is a schematic flow chart showing a method for synchronizing information according to an illustrative embodiment of the present disclosure.

In some optional embodiments, referring to FIG. 8, which is a schematic flow chart showing a method for synchronizing information according to an illustrative embodiment of the present disclosure, the method includes steps 801 to 807.

In step 801, a first field configured to indicate the digital key name is determined by the vehicle-side device based on a first name of the digital key changed in response to determining that the digital key name has been changed by the vehicle-side device.

In an embodiment of the present disclosure, in the case where the vehicle-side device determines that the digital key name on the vehicle-side device side has been changed by a user, the first field that is in the preset TLV format may be determined based on the first name of the digital key changed.

In a possible implementation, the terminal device and the vehicle-side device may negotiate the preset TLV format in advance, or the preset TLV format may be predetermined in a protocol.

In another possible implementation, the vehicle-side device can set the value of the Tag field to 0xD3 according to the preset TLV format to indicate the digital key name, a value of a length field may be determined according to a length of the first name, and a value of a value field may be set to the first name to obtain the first field.

In step 802, the first field is written by the vehicle-side device into a designated storage area on the terminal device.

In an embodiment of the present disclosure, the designated storage area is a storage area that supports access of the terminal device and the vehicle-side device. The vehicle-side device can access the designated storage area on the terminal device and write the first field into the designated storage area.

In step 803, it is determined that the digital key name has been changed by the vehicle-side device in response to detecting, by a digital key applet on the terminal device, a first field configured to indicate the digital key name in a designated storage area on the terminal device.

In step 804, a notification message is sent to a digital key framework on the terminal device by the digital key applet.

In an embodiment of the present disclosure, the notification message is configured to notify the digital key framework that the digital key name has been changed by the vehicle-side device. In a possible implementation, the notification message may be sent to the digital key framework by the digital key applet via HCI.

In step 805, the first name indicated by the first field is acquired by the digital key framework, in response to receiving the notification message by the digital key framework.

In an embodiment of the present disclosure, when the digital key framework receives the notification message, the digital key framework can read the value field included in the first field in the designated storage area, so as to determine the first name.

In step 806, a digital key name displayed on the terminal device is changed to the first name by the terminal device.

In an embodiment of the present disclosure, the digital key name displayed on the terminal device may be changed to the first name by the digital key framework on the terminal device.

In step 807, the first field in the designated storage area is deleted by the terminal device.

It is understood that the step 807, similar to the step 604, is an optional step to be performed.

For example, at the stage of registering digital key information, the terminal device and the vehicle-side device synchronize the digital key name as "Li Si's key". In subsequent use, a user changes the digital key name to "Zhang San's A brand vehicle key" at the side of the vehicle-side device. In the related art, the terminal device cannot synchronize the digital key name changed by the vehicle-side device, so the digital key name displayed on the vehicle-side device is "Zhang San's A brand vehicle key", while the digital key name displayed on the terminal device still is "Li Si's key", resulting in poor user experiences. In contrast, the above-mentioned methods provided by the present disclosure can synchronously change the digital key name displayed on the terminal device to "Zhang San's A brand vehicle key", and the terminal device and the vehicle-side device can automatically complete the synchronization process of the digital key name, so as to ensure that the digital key names on the two devices are consistent. In the above-mentioned embodiments, in the case where the digital key name has been changed by the vehicle-side device, the digital key applet on the terminal device can determine that the digital key name has been changed by the vehicle-side device, and notify the digital key framework on the terminal device, and the first name of the digital key changed by the vehicle-side device may be acquired by the digital key framework on the terminal device and synchronously displayed on the terminal device. In this way, the purpose of synchronizing the digital key name between the terminal device and the vehicle-side device is realized with high availability.

Figure 9:
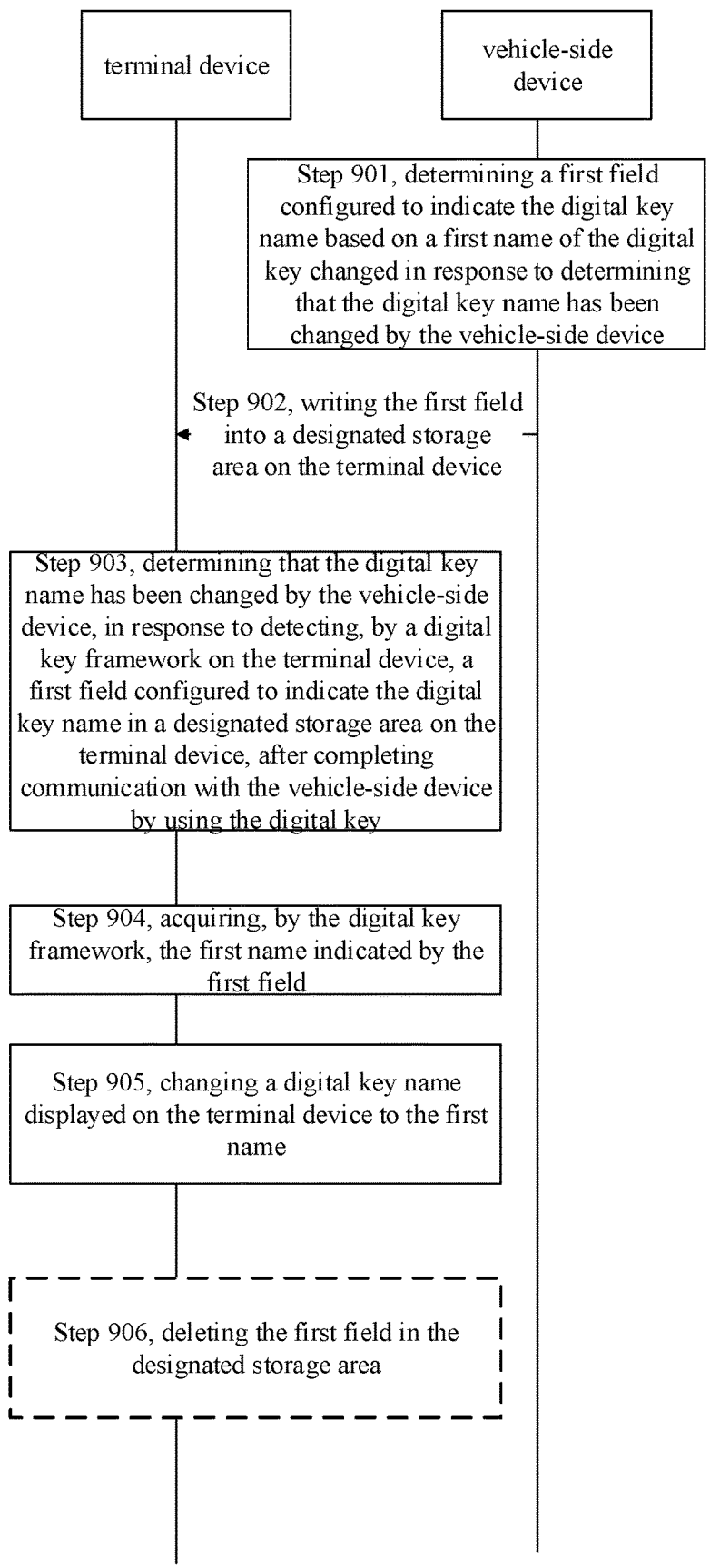
FIG. 9 is a schematic flow chart showing a method for synchronizing information according to an illustrative embodiment of the present disclosure.

In some optional embodiments, referring to FIG. 9, which is a schematic flow chart showing a method for synchronizing information according to an illustrative embodiment of the present disclosure, the method includes steps 901 to 906.

In step 901, a first field configured to indicate the digital key name is determined by the vehicle-side device based on a first name of the digital key changed in response to determining that the digital key name has been changed by the vehicle-side device.

In an embodiment of the present disclosure, in the case where the vehicle-side device determines that the digital key name on the vehicle-side device has been changed by a user, the first field that is in the preset TLV format may be determined based on the first name of the digital key changed. A mode of determining the first field is similar to that described in the step 801, which will not be elaborated herein.

In step 902, the first field is written by the vehicle-side device into a designated storage area on the terminal device.

In an embodiment of the present disclosure, the designated storage area is a storage area that supports access of the terminal device and the vehicle-side device. The vehicle-side device can access the designated storage area on the terminal device and write the first field into the designated storage area.

In step 903, it is determined that the digital key name has been changed by the vehicle-side device, in response to detecting, by a digital key framework on the terminal device, a first field configured to indicate the digital key name in a designated storage area on the terminal device, after completing communication with the vehicle-side device by using the digital key.

In step 904, the first name indicated by the first field is acquired by the digital key framework.

In an embodiment of the present disclosure, in the case where the digital key framework determines that the digital key name has been changed by the vehicle-side device, the digital key framework can acquire the value field of the first field in the designated storage area, so as to determine the first name. The first name is the digital key name changed by the vehicle-side device.

In step 905, a digital key name displayed on the terminal device is changed to the first name by the terminal device.

In an embodiment of the present disclosure, the digital key name displayed on the terminal device may be changed to the first name by the digital key framework.

In step 906, the first field in the designated storage area is deleted by the terminal device.

The step 906 is an optional step to be performed.

In the above-mentioned embodiments, in the case where the digital key name has been changed by the vehicle-side device, it may be determined by the digital key framework on the terminal device that the digital key name has been changed by the vehicle-side device, and the first name of the digital key changed by the vehicle-side device may be acquired and displayed on the terminal device synchronously. In this way, the purpose of synchronizing the digital key name between the terminal device and the vehicle-side device can be realized with high availability.

Figure 10:
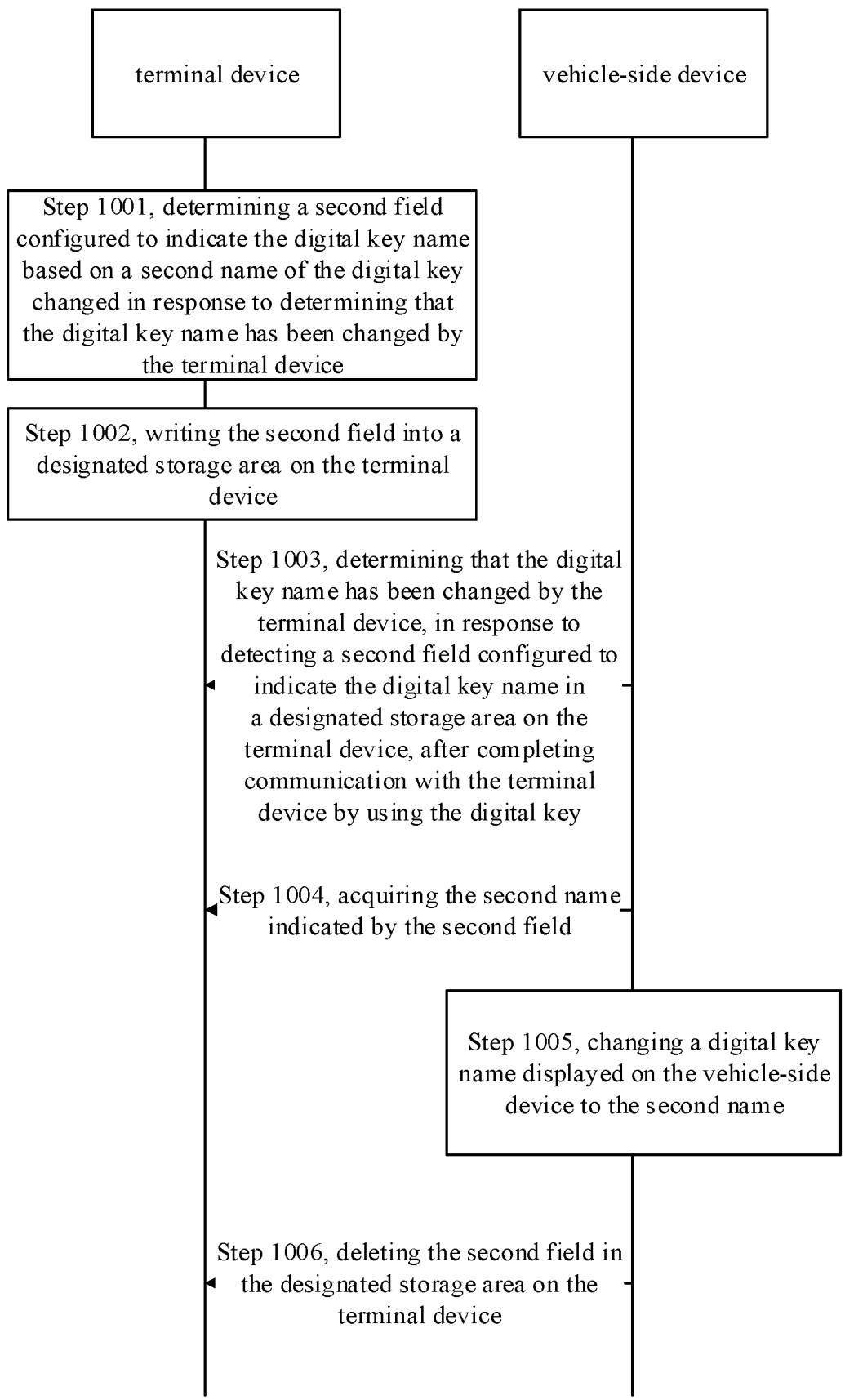
FIG. 10 is a schematic flow chart showing a method for synchronizing information according to an illustrative embodiment of the present disclosure.

In some optional embodiments, referring to FIG. 10, which is a schematic flow chart showing a method for synchronizing information according to an illustrative embodiment of the present disclosure, the method includes steps 1001 to 1006.

In step 1001, a second field configured to indicate the digital key name is determined by the terminal device based on a second name of the digital key changed in response to determining that the digital key name has been changed by the terminal device.

In an embodiment of the present disclosure, in the case where the terminal device determines that the digital key name on the terminal device has been changed by a user, the second field that is in the preset TLV format may be determined based on the second name of the digital key changed. A mode of determining the second field is similar to that described in the step 801, which will not be elaborated herein.

In step 1002, the second field is written by the terminal device into a designated storage area on the terminal device.

In an embodiment of the present disclosure, the designated storage area is a storage area that supports access of the terminal device and the vehicle-side device. The second field may be written into the designated storage area by the digital key framework on the terminal device.

In step 1003, the vehicle-side device determine that the digital key name has been changed by the terminal device, in response to detecting a second field configured to indicate the digital key name in a designated storage area on the terminal device, after completing communication with the terminal device by using the digital key.

In step 1004, the second name indicated by the second field is acquired by the vehicle-side device.

In an embodiment of the present disclosure, in the case of determining that the digital key name has been changed by the terminal device, the value field of the second field in the designated storage area on the terminal device may be acquired by the vehicle-side device, so as to determine the second name, and the second name is the digital key name changed by the terminal device.

In step 1005, a digital key name displayed on the vehicle-side device is changed by the vehicle-side device to the second name.

In step 1006, the second field in the designated storage area on the terminal device is deleted by the vehicle-side device.

The step 1006 is an optional step to be performed.

For example, at the stage of registering digital key information, the terminal device and the vehicle-side device synchronize the digital key name as "Zhang San's B brand vehicle key", In subsequent use, a user changes the digital key name to "Li Si's C brand vehicle key" at the side of the terminal device. In the related art, the vehicle-side device cannot synchronize the digital key name changed by the terminal device, so the digital key name displayed on the vehicle-side device is "Zhang San's B brand vehicle key", while the digital key name displayed on the terminal device is "Li Si's C brand vehicle key", resulting in poor user experiences. In contrast, the above-mentioned method provided by the present disclosure can synchronously change the digital key name displayed on the vehicle-side device to "Li Si's C brand vehicle key", and the terminal device and the vehicle-side device can automatically complete the synchronization process of the digital key name, so as to ensure that the digital key names on the two devices are consistent.

In the above-mentioned embodiments, in the case where the digital key name has been changed by the terminal device, the second name of the digital key changed by the terminal device may be acquired by the vehicle-side device and displayed on the vehicle-side device synchronously. In this way, the purpose of synchronizing the digital key name between the terminal device and the vehicle-side device is realized with high availability.

Corresponding to embodiments of the application function implementing method as described above, the present disclosure also provides embodiments of an application function implementing apparatus.

Figure 11:
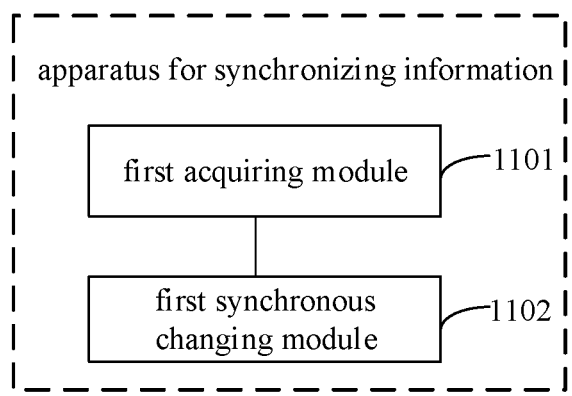
FIG. 11 is a block diagram showing an apparatus for synchronizing information according to an illustrative embodiment of the present disclosure.

FIG. 11 is a block diagram showing an apparatus for synchronizing information according to an illustrative embodiment. Referring to FIG. 11, the apparatus is applied to a terminal device, and includes a first acquiring module 1101, and a first synchronous changing module 1102.

The first acquiring module 1101 is configured to acquire, in response to determining that a digital key name has been changed by a vehicle-side device, a first name of a digital key changed by the vehicle-side device.

The first synchronous changing module 1102 is configured to change a digital key name displayed on the terminal device to the first name.

Specific implementations are similar to those provided above with reference to FIG. 1, which will not be elaborated herein.

In some optional embodiments, the first acquiring module includes a first determining submodule.

The first determining submodule is configured to determine that the digital key name has been changed by the vehicle-side device in response to detecting, by a digital key applet on the terminal device, a first field configured to indicate the digital key name in a designated storage area on the terminal device. The designated storage area is a storage area that supports access of the terminal device and the vehicle-side device.

In some embodiments, the apparatus further includes a sending module.

The sending module is configured to send a notification message to a digital key framework on the terminal device by the digital key applet. The notification message is configured to notify the digital key framework that the digital key name has been changed by the vehicle-side device.

The first acquiring module includes a first acquiring submodule.

The first acquiring submodule is configured to acquire, by the digital key framework, the first name indicated by the first field in response to receiving the notification message by the digital key framework.

In some embodiments, the sending module includes a sending submodule.

The sending submodule is configured to send the notification message to the digital key framework on the terminal device by the digital key applet via a host controller interface (HCI).

In some embodiments, the apparatus further includes a first deleting module.

The first deleting module is configured to delete the first field in the designated storage area.

In some embodiments, the first field is in a preset TLV format.

Specific implementations are similar to those provided above with reference to FIG. 2, which will not be elaborated herein.

In some optional embodiments, the first acquiring module includes a second determining submodule.

The second determining submodule is configured to determine that the digital key name has been changed by the vehicle-side device, in response to detecting, by a digital key framework on the terminal device, a first field configured to indicate the digital key name in a designated storage area on the terminal device, after completing communication with the vehicle-side device by using the digital key. The designated storage area is a storage area that supports access of the terminal device and the vehicle-side device.

The first acquiring module includes a second acquiring submodule.

The second acquiring submodule is configured to acquire, by the digital key framework, the first name indicated by the first field.

In some embodiments, the apparatus further includes a second deleting module.

The second deleting module is configured to delete the first field in the designated storage area.

In some embodiments, the first field is in a preset TLV format.

Specific implementations are similar to those provided above with reference to FIG. 3, which will not be elaborated herein.

In some optional embodiments, the apparatus further includes a first determining module, and a first writing module.

The first determining module is configured to determine a second field configured to indicate the digital key name based on a second name of the digital key changed in response to determining that the digital key name has been changed by the terminal device.

The first writing module is configured to write the second field into a designated storage area on the terminal device. The designated storage area is a storage area that supports access of the terminal device and the vehicle-side device.

In some embodiments, the second field is in a preset TLV format.

Specific implementations are similar to those provided above with reference to FIG. 4, which will not be elaborated herein.

Figure 12:
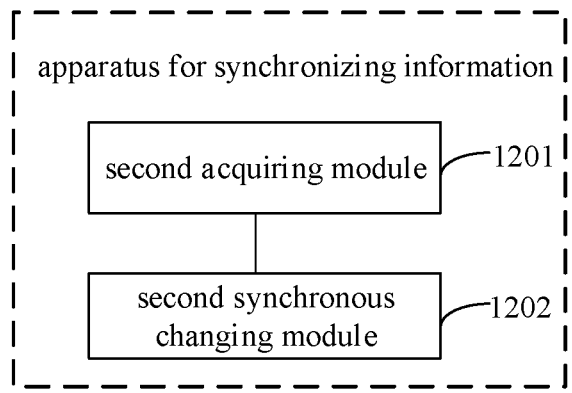
FIG. 12 is a block diagram showing an apparatus for synchronizing information according to an illustrative embodiment of the present disclosure.

FIG. 12 is a block diagram showing an apparatus for synchronizing information according to an illustrative embodiment. Referring to FIG. 12, the apparatus is applied to a vehicle-side device, and includes a second acquiring module 1201, and a second synchronous changing module 1202.

The second acquiring module 1201 is configured to acquire, in response to determining that a digital key name has been changed by a terminal device, a second name of a digital key changed by the terminal device.

The second synchronous changing module 1202 is configured to change a digital key name displayed on the vehicle-side device to the second name.

Specific implementations are similar to those provided above with reference to FIG. 5, which will not be elaborated herein.

In some optional embodiments, the second acquiring module includes a third determining submodule.

The third determining submodule is configured to determine that the digital key name has been changed by the terminal device, in response to detecting a second field configured to indicate the digital key name in a designated storage area on the terminal device, after completing communication with the terminal device by using the digital key. The designated storage area is a storage area that supports access of the terminal device and the vehicle-side device.

The second acquiring module includes a third acquiring submodule.

The third acquiring submodule is configured to acquire the second name indicated by the second field.

In some embodiments, the apparatus further includes a second deleting module.

The second deleting module is configured to delete the second field in the designated storage area on the terminal device.

In some embodiments, the second field is in a preset TLV format.

Specific implementations are similar to those provided above with reference to FIG. 6, which will not be elaborated herein.

In some optional embodiments, the apparatus further includes a second determining module, and a second writing module.

The second determining module is configured to determine a first field configured to indicate the digital key name based on a first name of the digital key changed in response to determining that the digital key name has been changed by the vehicle-side device.

The second writing module is configured to write the first field into a designated storage area on the terminal device. The designated storage area is a storage area that supports access of the terminal device and the vehicle-side device.

In some embodiments, the first field is in a preset TLV format.

Specific implementations are similar to those provided above with reference to FIG. 7, which will not be elaborated herein.

Since the apparatus embodiments substantially correspond to the method embodiments, reference can be made to the relevant descriptions of the method embodiments. The above-described apparatus embodiments are merely for the purpose of illustration, in which the units described as separate components may be or may not be physically separated, and the components displayed as units may be or may not be physical units, that is, they may be either located at one place or distributed onto a plurality of network units. The objects of the technical solutions of the present disclosure may be achieved by some or all of the modules in accordance with practical requirements. The technical solutions of the present disclosure would be appreciated and executable by those skilled in the art without creative efforts.

Correspondingly, the present disclosure also provides a computer-readable storage medium having stored therein computer programs that, when executed by a processor, cause steps in the method for synchronizing information as described in any embodiment above from the side of the terminal device to be implemented.

Correspondingly, the present disclosure also provides a computer-readable storage medium having stored therein computer programs that, when executed by a processor, cause steps in the method for synchronizing information as described in any embodiment above from the side of the vehicle-side device to be implemented.

Correspondingly, the present disclosure also provides an apparatus for synchronizing information, including a processor; and a memory for storing instructions executable by the processor. The processor is configured to execute the instructions to implement the steps of the method for synchronizing information as described in any embodiment above from the side of the terminal device.

Figure 13:
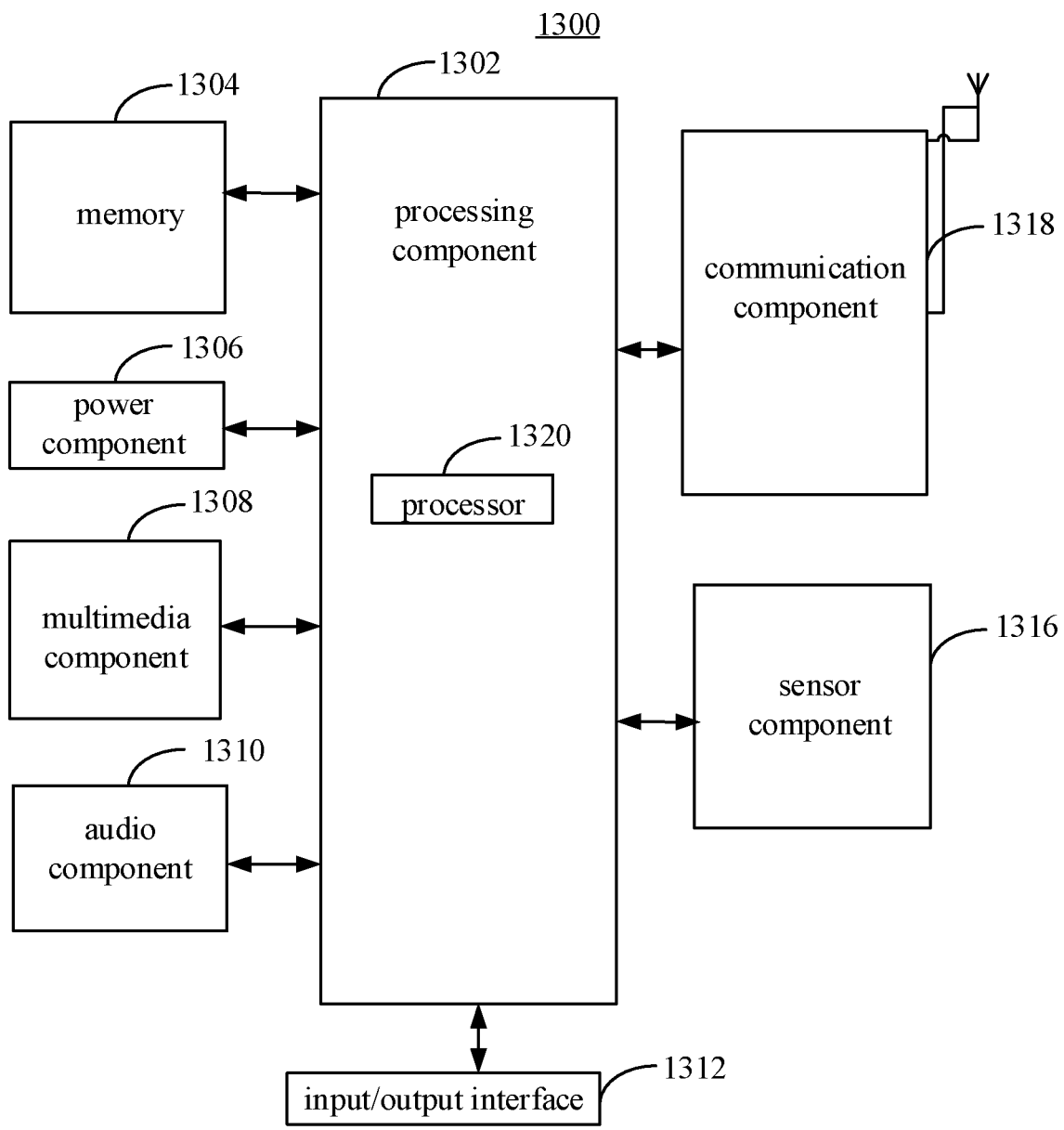
FIG. 13 is a schematic diagram showing an apparatus for synchronizing information according to an illustrative embodiment of the present disclosure.

FIG. 13 is a schematic block diagram showing an apparatus for synchronizing information according to an illustrative embodiment. For example, the apparatus 1300 may be a terminal device such as a mobile phone, a computer, a digital broadcast terminal, a messaging device, a game console, a tablet device, a medical device, a fitness device, a personal digital assistant, or the like.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1316, and a communication component 1318.

The processing component 1302 typically controls overall operations of the apparatus 1300, such as the operations associated with display, phone calls, data communications, camera operations, and recording operations. The processing component 1302 can include one or more processors 1320 to execute instructions to perform all or some of the steps in the above-described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

One of the processors 1320 in the processing component 1302 may be configured to implement the method for synchronizing information as described in any embodiment above from the side of the terminal device.

The memory 1304 is configured to store various types of data to support the operation of the apparatus 1300. Examples of such data include instructions for any applications or methods operated on the apparatus 1300, contact data, phonebook data, messages, pictures, videos, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive an external multimedia datum while the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, and a voice recognition mode. The received audio signal may be further stored in the memory 1304 or transmitted via the communication component 1318. In some embodiments, the audio component 1310 further includes a speaker to output audio signals.

The I/O interface 1312 provides an interface between the processing component 1302 and peripheral interface modules, such as keyboards, click wheels, buttons, and the like. The buttons may include, but are not limited to, a home button, a volume button, a starting button, and a locking button.

The sensor component 1316 includes one or more sensors to provide status assessments of various aspects of the apparatus 1300. For instance, the sensor component 1316 may detect an open/closed status of the apparatus 1300, relative positioning of components, e.g., the display and the keypad, of the apparatus 1300, a change in position of the apparatus 1300 or an component of the apparatus 1300, a presence or absence of user contact with the apparatus 1300, an orientation or an acceleration/deceleration of the apparatus 1300, and a change in temperature of the apparatus 1300. The sensor component 1316 may include a proximity sensor configured to detect the presence of nearby objects without any physical contact. The sensor component 1316 may include a light sensor, such as a CMOS or CCD image sensor, for use in imaging applications. In some embodiments, the sensor component 1316 may further include an accelerometer sensor, a gyroscope sensor, a magnetic sensor, a pressure sensor, or a temperature sensor.

The communication component 1318 is configured to facilitate communication, wired or wireless, between the apparatus 1300 and other devices. The apparatus 1300 can access a wireless network based on a communication standard, such as WiFi, 3G, 4G, 5G, 6G or a combination thereof. In an illustrative embodiment, the communication component 1318 receives a broadcast signal or broadcast associated information from an external broadcast management system via a broadcast channel. In an illustrative embodiment, the communication component 1318 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-mentioned method.

In an illustrative embodiment, there is also provided a non-transitory computer readable storage medium including instructions, such as included in the memory 1304, executable by the processor 1320 in the apparatus 1300, for completing the above-mentioned method. For example, the non-transitory computer-readable storage medium may be a ROM, a random access memory (RAM), a CD-ROM, a magnetic tape, a floppy disc, an optical data storage device, and the like.

Correspondingly, the present disclosure also provides an apparatus for synchronizing information, including a processor; and a memory for storing instructions executable by the processor. The processor is configured to execute the instructions to implement steps of the method for synchronizing information as described in any embodiment above from the side of the vehicle-side device.

Figure 14:
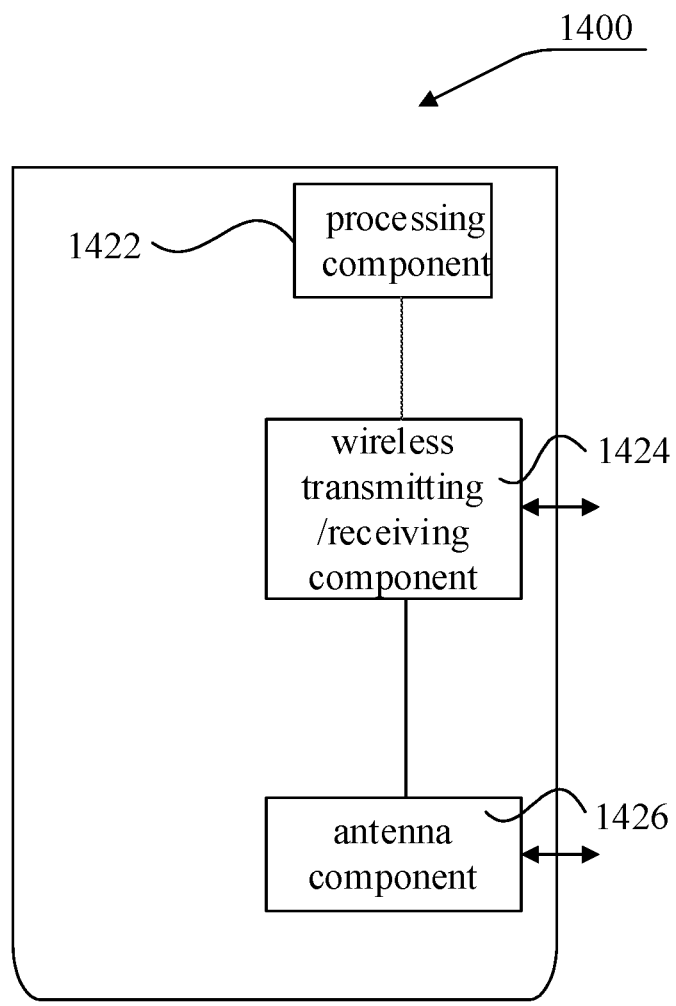
FIG. 14 is a schematic diagram showing an apparatus for synchronizing information according to an illustrative embodiment of the present disclosure.

FIG. 14 is a schematic diagram showing an apparatus 1400 for synchronizing information according to an illustrative embodiment. The apparatus 1400 may be provided as a vehicle-side device. Referring to FIG. 14, the apparatus 1400 includes a processing component 1422, a wireless transmitting/receiving component 1424, an antenna component 1426, and a signal processing portion specific to a wireless interface, and the processing component 1422 may further include one or more processors.

One of the processors of the processing component 1422 may be configured to implement the method for synchronizing information as described in any embodiment above from the side of the vehicle-side devices.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

According to a first aspect of embodiments of the present disclosure, there is provided a method for synchronizing information, which is applied to a terminal device. The method includes acquiring, in response to determining that a digital key name has been changed by a vehicle-side device, a first name of a digital key changed by the vehicle-side device; and changing a digital key name displayed on the terminal device to the first name.

In some embodiments, determining that the digital key name has been changed by the vehicle-side device includes determining that the digital key name has been changed by the vehicle-side device in response to detecting, by a digital key applet on the terminal device, a first field configured to indicate the digital key name in a designated storage area on the terminal device. The designated storage area is a storage area that supports access of the terminal device and the vehicle-side device.

In some embodiments, the method further includes sending a notification message to a digital key framework on the terminal device by the digital key applet. The notification message is configured to notify the digital key framework that the digital key name has been changed by the vehicle-side device. Acquiring the first name of the digital key changed by the vehicle-side device includes acquiring, by the digital key framework, the first name indicated by the first field in response to receiving the notification message by the digital key framework.

In some embodiments, sending the notification message to the digital key framework on the terminal device by the digital key applet includes sending the notification message to the digital key framework on the terminal device by the digital key applet via a host controller interface (HCI).

In some embodiments, determining that the digital key name has been changed by the vehicle-side device includes determining that the digital key name has been changed by the vehicle-side device, in response to detecting, by a digital key framework on the terminal device, a first field configured to indicate the digital key name in a designated storage area on the terminal device, after completing communication with the vehicle-side device by using the digital key. The designated storage area is a storage area that supports access of the terminal device and the vehicle-side device. Acquiring the first name of the digital key changed by the vehicle-side device includes acquiring, by the digital key framework, the first name indicated by the first field.

In some embodiments, after changing the digital key name displayed on the terminal device to the first name, the method further includes deleting the first field in the designated storage area.

In some embodiments, the first field is in a preset tag length value (TLV) format.

In some embodiments, the method further includes determining a second field configured to indicate the digital key name based on a second name of the digital key changed in response to determining that the digital key name has been changed by the terminal device; and writing the second field into a designated storage area on the terminal device. The designated storage area is a storage area that supports access of the terminal device and the vehicle-side device.

In some embodiments, the second field is in a preset TLV format.

In some embodiments, acquiring the first name of the digital key changed by the vehicle-side device includes: acquiring the first name indicated by a first field generated lastly.

According to a second aspect of embodiments of the present disclosure, there is provided a method for synchronizing information, which is applied to a vehicle-side device. The method includes acquiring, in response to determining that a digital key name has been changed by a terminal device, a second name of a digital key changed by the terminal device; and changing a digital key name displayed on the vehicle-side device to the second name.

In some embodiments, determining that the digital key name has been changed by the terminal device includes determining that the digital key name has been changed by the terminal device, in response to detecting a second field configured to indicate the digital key name in a designated storage area on the terminal device, after completing communication with the terminal device by using the digital key. The designated storage area is a storage area that supports access of the terminal device and the vehicle-side device. Acquiring the second name of the digital key changed by the terminal device includes acquiring the second name indicated by the second field.

In some embodiments, after changing the digital key name displayed on the vehicle-side device to the second name, the method further includes deleting the second field in the designated storage area on the terminal device.

In some embodiments, the second field is in a preset TLV format.

In some embodiments, the method further includes determining a first field configured to indicate the digital key name based on a first name of the digital key changed in response to determining that the digital key name has been changed by the vehicle-side device; and writing the first field into a designated storage area on the terminal device. The designated storage area is a storage area that supports access of the terminal device and the vehicle-side device.

In some embodiments, the first field is in a preset TLV format.

According to a third aspect of embodiments of the present disclosure, there is provided an apparatus for synchronizing information, which is applied to a terminal device. The apparatus includes a first acquiring module configured to acquire, in response to determining that a digital key name has been changed by a vehicle-side device, a first name of a digital key changed by the vehicle-side device; and a first synchronous changing module configured to change a digital key name displayed on the terminal device to the first name.

According to a fourth aspect of embodiments of the present disclosure, there is provided an apparatus for synchronizing information, which is applied to a vehicle-side device. The apparatus includes a second acquiring module configured to acquire, in response to determining that a digital key name has been changed by a terminal device, a second name of a digital key changed by the terminal device; and a second synchronous changing module configured to change a digital key name displayed on the vehicle-side device to the second name.

According to a fifth aspect of embodiments of the present disclosure, there is provided a computer-readable storage medium having stored therein computer programs that, when executed by a processor, cause steps in the method for synchronizing information as described in any embodiment above from the side of the terminal device side to be implemented.

According to a sixth aspect of embodiments of the present disclosure, there is provided a computer-readable storage medium having stored therein computer programs that, when executed by a processor, cause steps in the method for synchronizing information as described in any embodiment above from the side of the vehicle-side device to be implemented.

According to a seventh aspect of embodiments of the present disclosure, there is provided an apparatus for synchronizing information. The apparatus includes a processor; and a memory for storing instructions executable by the processor. The processor is configured to execute the instructions to implement steps of the method for synchronizing information as described in any embodiment above from the side of the terminal device side.

According to an eighth aspect of embodiments of the present disclosure, there is provided an apparatus for synchronizing information. The apparatus includes a processor; and a memory for storing instructions executable by the processor. The processor is configured to execute the instructions to implement steps of the method for synchronizing information as described in any embodiment above from the side of the vehicle-side device.

The technical solutions provided by the embodiments of the present disclosure can include the following beneficial effects.

With embodiments of the present disclosure, the digital key name can be synchronized between the terminal device and the vehicle-side device with high availability.

What is claimed is:

1. A method for synchronizing information, applied to a terminal device, comprising:
   acquiring, in response to determining that a digital key name has been changed by a vehicle-side device, a first name of a digital key changed by the vehicle-side device;
   changing a digital key name displayed on the terminal device to the first name;
   determining a second field configured to indicate the digital key name based on a second name of the digital key changed in response to determining that the digital key name has been changed by the terminal device; and
   writing the second field into a designated storage area on the terminal device; wherein the designated storage area is a storage area that supports access of the terminal device and the vehicle-side device.

2. The method of claim 1, wherein determining that the digital key name has been changed by the vehicle-side device comprises:
   determining that the digital key name has been changed by the vehicle-side device in response to detecting, by a digital key applet on the terminal device, a first field configured to indicate the digital key name in a designated storage area on the terminal device; wherein the designated storage area is a storage area that supports access of the terminal device and the vehicle-side device.

3. The method of claim 2, further comprising:
   sending a notification message to a digital key framework on the terminal device by the digital key applet; wherein the notification message is configured to notify the digital key framework that the digital key name has been changed by the vehicle-side device;
   wherein acquiring the first name of the digital key changed by the vehicle-side device comprises:
   acquiring, by the digital key framework, the first name indicated by the first field in response to receiving the notification message by the digital key framework.

4. The method of claim 3, wherein sending the notification message to the digital key framework on the terminal device by the digital key applet comprises:
   sending the notification message to the digital key framework on the terminal device by the digital key applet via a host controller interface (HCI).

5. The method of claim 2, after changing the digital key name displayed on the terminal device to the first name, further comprising:
   deleting the first field in the designated storage area.

6. The method of claim 2, wherein the first field is in a preset tag length value (TLV) format.

7. The method of claim 1, wherein determining that the digital key name has been changed by the vehicle-side device comprises:
   determining that the digital key name has been changed by the vehicle-side device, in response to detecting, by a digital key framework on the terminal device, a first field configured to indicate the digital key name in a designated storage area on the terminal device, after completing communication with the vehicle-side device by using the digital key; wherein the designated storage area is a storage area that supports access of the terminal device and the vehicle-side device;
   and wherein acquiring the first name of the digital key changed by the vehicle-side device comprises:
   acquiring, by the digital key framework, the first name indicated by the first field.

8. The method of claim 1, wherein the second field is in a preset TLV format.

9. The method of claim 1, wherein acquiring the first name of the digital key changed by the vehicle-side device comprises:
   acquiring the first name indicated by a first field with a latest generation time point.

10. A non-transitory computer-readable storage medium having stored therein computer programs that, when executed by a processor, cause steps in the method for synchronizing information of claim 1 to be implemented.

11. A method for synchronizing information, applied to a vehicle-side device, comprising:
    acquiring, in response to determining that a digital key name has been changed by a terminal device, a second name of a digital key changed by the terminal device; and
    changing a digital key name displayed on the vehicle-side device to the second name;
    wherein determining that the digital key name has been changed by the terminal device comprises:
    determining that the digital key name has been changed by the terminal device, in response to detecting a second field configured to indicate the digital key name in a designated storage area on the terminal device, after completing communication with the terminal device by using the digital key; wherein the designated storage area is a storage area that supports access of the terminal device and the vehicle-side device;
    and wherein acquiring the second name of the digital key changed by the terminal device comprises:
    acquiring the second name indicated by the second field.

12. The method of claim 11, after changing the digital key name displayed on the vehicle-side device to the second name, further comprising:
    deleting the second field in the designated storage area on the terminal device.

13. The method of claim 11, wherein the second field is in a preset tag length value (TLV) format.

14. The method of claim 11, further comprising:
    determining a first field configured to indicate the digital key name based on a first name of the digital key changed in response to determining that the digital key name has been changed by the vehicle-side device; and
    writing the first field into a designated storage area on the terminal device; wherein the designated storage area is a storage area that supports access of the terminal device and the vehicle-side device.

15. The method of claim 14, wherein the first field is in a preset TLV format.

16. A non-transitory computer-readable storage medium having stored therein computer programs that, when executed by a processor, cause steps in the method for synchronizing information of claim 11 to be implemented.

17. An apparatus for synchronizing information, comprising:
    a processor; and
    a memory for storing instructions executable by the processor;

wherein the processor is configured to execute the instructions to implement steps of the method for synchronizing information of claim 11.

18. An apparatus for synchronizing information, comprising:
- a processor; and
- a memory for storing instructions executable by the processor;
- wherein the processor is configured to execute the instructions to implement the following steps:
- acquiring, in response to determining that a digital key name has been changed by a vehicle-side device, a first name of a digital key changed by the vehicle-side device;
- changing a digital key name displayed on the terminal device to the first name;
- determining a second field configured to indicate the digital key name based on a second name of the digital key changed in response to determining that the digital key name has been changed by the terminal device; and
- writing the second field into a designated storage area on the terminal device; wherein the designated storage area is a storage area that supports access of the terminal device and the vehicle-side device.

* * * * *